(12) United States Patent
Takala

(10) Patent No.: US 6,640,296 B2
(45) Date of Patent: Oct. 28, 2003

(54) DATA PROCESSING METHOD AND DEVICE FOR PARALLEL STRIDE ACCESS

(75) Inventor: Jarmo Takala, Tampere (FI)

(73) Assignee: Nokia Corporation, Espoo (FI)

( * ) Notice: Subject to any disclaimer, the term of this patent is extended or adjusted under 35 U.S.C. 154(b) by 20 days.

(21) Appl. No.: 10/094,518

(22) Filed: Mar. 7, 2002

(65) Prior Publication Data

US 2003/0172245 A1 Sep. 11, 2003

(51) Int. Cl.[7] ............................................... G06F 12/06
(52) U.S. Cl. ........................ 711/220; 711/216; 711/221; 711/5; 711/211; 711/202; 711/205; 711/207; 711/209
(58) Field of Search ................................ 711/1, 5, 150, 711/200, 202, 205, 207, 209, 211, 216, 220, 221

(56) References Cited

U.S. PATENT DOCUMENTS

| | | | | |
|---|---|---|---|---|
| 3,806,886 A | * | 4/1974 | McClellan et al. | 365/189.02 |
| 4,841,487 A | * | 6/1989 | Demura et al. | 365/230.01 |
| 4,918,600 A | | 4/1990 | Harper, III et al. | |
| 4,992,979 A | * | 2/1991 | Aichelman, Jr. et al. | 365/230.03 |
| 5,210,845 A | * | 5/1993 | Crawford et al. | 711/128 |
| 5,436,910 A | * | 7/1995 | Takeshima et al. | 714/718 |
| 5,740,179 A | * | 4/1998 | Dorney et al. | 714/719 |
| 5,991,866 A | * | 11/1999 | Heller et al. | 712/10 |
| 6,411,230 B1 | * | 6/2002 | Tauchen et al. | 341/101 |

FOREIGN PATENT DOCUMENTS

EP 0313788 6/1995

OTHER PUBLICATIONS

"Simplified Control of FFT Hardware"; D. Cohen; IEEE Trans Acoustics, Speech and Signal Processing; pp. 577–579, Dec. 1976.
"Block, Multistride Vector, and FFT Accesses in Parallel Memory Systems"; D. T. Harper III; IEEE Trans. Parallel and Distributed Systems; vol. 2, No. 1, pp. 43–51, Jan. 1991.

* cited by examiner

Primary Examiner—B. James Peikari
(74) Attorney, Agent, or Firm—Ware, Fressola, Van Der Sluys & Adolphson LLP

(57) ABSTRACT

A method and apparatus for accessing data elements of an N-element data block on N memory locations distributed over Q memory modules via Q parallel accesses. The Q memory modules are addressable in a q-bit module address and an (n–q) bit row address in a power-of-two stride fashion. The row address is selected from (n–q) bits of the index address, and the module address for one of the Q accesses is obtained from bitwise exclusive-OR operation on bits obtained from corresponding positions in a plurality of q-bit fields grouped from the index address.

20 Claims, 6 Drawing Sheets

DATA PROCESSING METHOD AND DEVICE FOR PARALLEL STRIDE ACCESS

FIELD OF THE INVENTION

The present invention relates generally to data processing in a device having a plurality of memory modules, which are accessed in parallel in order to retrieve and store data elements in the memory modules, and, more particularly, to a power-of-two stride access, and a dynamic storage scheme for such a device.

BACKGROUND OF THE INVENTION

In hardware architectures containing parallel processing resources, several operands from the memory need to be transferred simultaneously for matching the processing power with the memory bandwidth. Multiple operand access can be realized by allocating an independent memory module for each operand access. With this approach, however, problems arise from the fact that the parallel data accesses are not always linear. That introduces access conflicts in that the data operands to be accessed are in the same memory modules and, therefore, they cannot be accessed simultaneously.

In digital signal processing (DSP), data elements are often accessed by taking every Kth element from the data array of N elements, wherein $N=2^n$, $K=2^k$ with $n=1, 2, \ldots$ and $k=0, 1, 2, \ldots, n-1$. In particular, every Kth element is taken but when the access exceeds $N-1$, the access pattern wraps back to the beginning. The elements are accessed in the order as shown below, with p being the new address and i being the linear ordering index:

$$p = \mathrm{mod}(Ki, N) + \lfloor Ki/N \rfloor, \ i = 0, 1, \ldots, N-1$$

where $\lfloor z \rfloor$ denotes the floor function of z, and is the greatest integer less than or equal to z; mod is a modulus operation. With such access ordering, an N-point array $(x_1, X_1, X_2, \ldots X_{N-1})$ will be accessed as $(x_0, X_K, X_{2K}, \ldots, X_{N-K}, X_1, X_{K+1}, X_{2K+1}, \ldots)$. Such an access pattern is related to stride by K permutation. Here K is a number defined by a power of two, and thus the access is referred to as a power-of-two stride access. Such interconnection topologies are present, for example, in discrete trigonometric transforms and trellis coding. A mapping method to enhance parallel power-of-two stride access is disclosed in Melton et al. (EP 0 313 788 B1). When an N-element data block has N memory locations distributed over Q memory modules, Q parallel accesses of every Kth data element can be carried out such that $N=2^n$, $Q=2^q$, $K=2^k$ with $n=1, 2, \ldots, q=1, 2, \ldots, n-1$ and $k=0, 1, 2, \ldots, n-1$.

In the past, access conflicts were avoided by using a technique called double buffering, where 2N memory locations are allocated for an N-point data array. With double buffering, while the data at one location is being written, the data at another location is read. This approach has been used in Viterbi-decoding in some DSP processors. The major drawback for this approach is that it increases the size of memory and increases the latency as well. Memory accesses can also be hard-coded into the software code. This method increases the code size. Alternatively, look-up tables can be used. However, look-up tables also increase the memory consumption and the number of memory accesses. Furthermore, multi-port memories can be used, but they are expensive in terms of area.

Specialized address generation units have been proposed, but they support only one specific stride-by-$2^k$ (a single access pattern) along with a stride-by-1, which is the linear access, or they are limited to certain data array sizes. Harper (U.S. Pat. No. 4,918,600) discloses a method of stride access wherein only two strides 1 and $2^k$ are supported at a time. However, Harper does not support stride-by-1 and stride-by-N/2 when more that 2 memories are used, i.e., 4, 8, etc. In such a case, we need to access elements indices (0, N/2, 1, N/2+1, 2, ... ). Especially parallel access of N/2 and 1 presents the conflict. The specialized address generation units may also support a certain number of parallel memories, as disclosed in Cohen (IEEE Trans Acoustics, Speech, and Signal Processing, December 1976, pp.577–579).

Currently there are also parallel access schemes, which require an odd number of memory modules, and the number of memory modules being greater than the number of operands accessed simultaneously, as disclosed in D. T. Harper, "Block, multistride vector, and FFT accesses in parallel memory systems," (IEEE Trans. Parallel and Distributed Systems, vol. 2, no. 1, pp. 43–51, Jan. 1991). With these schemes, the memory consumption is also high and the memory is fragmented.

Thus, it is advantageous and desirable to provide a method and device for efficiently generating the addresses for Q parallel memory accesses according to stride permutation.

SUMMARY OF THE INVENTION

It is a primary object of the invention to provide a method of conflict-free access to parallel memory modules in a data processing device.

It is another object of the invention to provide an apparatus and system for mapping address locations to physical memory locations in parallel memory modules for conflict-free access for several strides.

These objects can be achieved by pre-selecting a storage scheme for each data block based on the number of elements in that data block and number of memory modules.

Thus, according to the first aspect of the present invention, there is provided a method of accessing data elements of an N-element data block on N memory locations distributed over Q memory modules via Q parallel accesses, wherein said N memory locations are addressable in an n-bit index address, and said Q memory modules are addressable in a q-bit module address and an (n–q) bit row address. The method is characterized by:

selecting (n–q) bits from the index address for providing the row address;

grouping the index address into a plurality of fields comprising a number of first fields, wherein each of the first fields contains q bits; and performing a logical function operation on bits obtained from corresponding positions in said plurality of fields for providing the module address for accessing the data element in one of said Q memory modules.

According to the present invention, said plurality of fields may comprise a second field, wherein the second field contains e bits, e being a positive integer smaller than q, and e depends on the relationship between n and q.

Preferably, the method is further characterized by performing a rotation operation on one of said plurality of fields for providing a third field, wherein said logical function is also performed on the third field in addition to said plurality of fields.

Preferably, the method is further characterized by concatenating (q−e) zeros to the second field.

According to the present invention, the method is further characterized by performing a rotation operation on one of said plurality of fields for providing a third field, wherein the one field on which the rotation operation is performed contains the least significant bits, and wherein said logical function is also performed on the third field in addition to said plurality of fields.

Preferably, said logical function is a bitwise exclusive-OR operation.

According to the present invention the n-bit index address can be arranged into an arbitrary order. In addition, the q-bit memory module address can also be reordered into arbitrary order.

According to the second aspect of the present invention, there is provided an apparatus for accessing a data element of an N-element data block on N memory locations distributed over Q memory modules via Q parallel accesses, wherein
  said N memory locations are addressable in an n-bit index address, and
  said Q memory modules are addressable in a q-bit module address and an (n−q) bit row address. The apparatus is characterized by:
    means (12), operatively connected to the index address, for selecting (n−q) bits from the index address for providing the row address; and
    means (40), operatively connected to the index address, for grouping the index address into a plurality of fields comprising a number of first fields, and for performing a logical function operation on bits obtained from corresponding positions in said plurality of fields for providing the module address for accessing the data elements in said Q memory modules, wherein each of the first fields contains q bits.

According to the present invention, said plurality of fields may further comprise a second field, wherein the second field contains e bits, e being a positive integer smaller than q, and e depends on the relationship between n and q; and the apparatus further comprises means (31), operatively connected to the second field, for concatenating (q−e) zeros to the second field prior to the performance of the logical function.

Advantageously, the apparatus is further characterized by means (30), operatively connected to one of said plurality of fields, for performing a rotation operation on said one of said plurality of fields for providing a third field, wherein said logical function is also performed on the third field in addition to said plurality of fields.

Preferably, the grouping and performing means (40) comprises a plurality of exclusive-OR devices.

According to the third aspect of the present invention, there is provided a data processing system (100) comprising a memory unit (120) for storing data elements and a data processing module (140), operatively connected to the memory unit for accessing the data elements, wherein the memory unit comprises an N-element data block in N memory locations addressable in an n-bit index address (20). The system is characterized in that the N-element data block on N memory locations is distributed over Q memory modules ($120_0$, ..., $120_{Q-1}$), wherein the Q memory modules are addressable in a q-bit module address (M) and an (n−q) bit row address (R);
  the data processing module comprises Q data processors ($142_0$, ..., $142_{Q-1}$), adapted to accessing the Q memory modules via Q parallel accesses; said system further characterized by
  an address generator (100), operatively connected to the memory unit, for providing access to the data elements in the memory unit, wherein the address generator comprises:
    a first address generator (12), operatively connected to the index address (20), for providing the row address (R); and
    a second address generator (40), operatively connected to the index address (20), for providing the module address (M), and
  an interconnector means (130, 132), operatively connected to the address generator (100), the memory unit 120 and the data processor module 140, for allowing the Q data processors to access the data elements in the Q memory modules, wherein
    the row address provided by the first address generator (20) is selected from (n−q) bits of the index address, and
    the module address provided by the second address generator is obtained by:
      grouping the index address (20) into a plurality of fields comprising a number of first fields, each first field containing q bits; and
      performing a logical function operation on bits obtained from corresponding position in said plurality of fields.

The present invention will become apparent upon reading the description taken in conjunction with FIGS. 1 to 6.

BEST MODE FOR CARRYING OUT THE INVENTION

Figure 1:
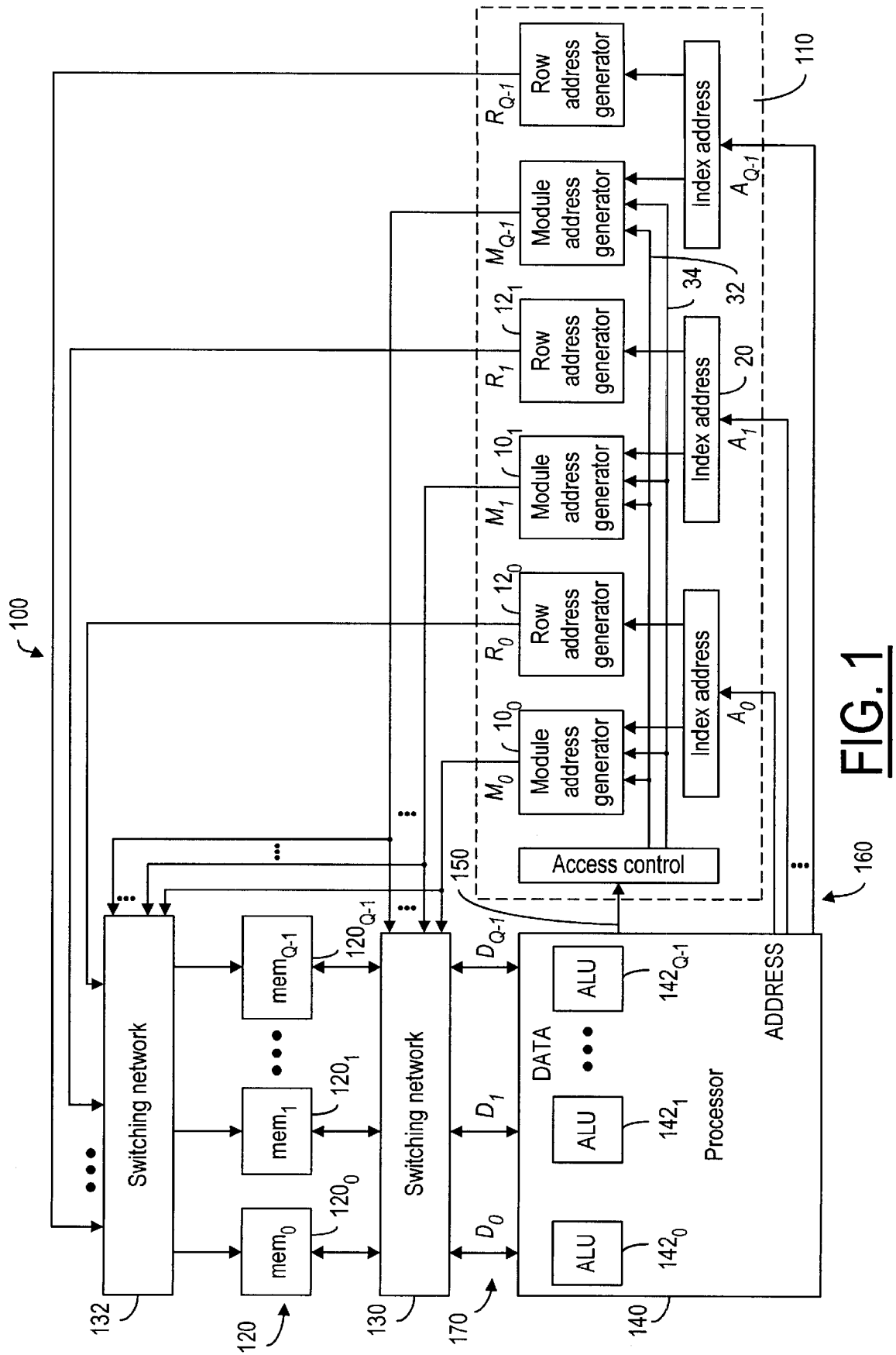
FIG. 1 is a block diagram showing a data processing system incorporating various aspects of the present invention.

FIG. 1 is a block diagram showing a data processing device 100, which incorporates various aspects of the present invention. The data processing device includes a processor 140, which may consume or produce Q data elements at a time. The processor 140 may contain a plurality of arithmetic units $142_0, 142_1, \ldots, 142_{Q-1}$ for data processing. Data elements are read from and written into a main memory generally designated 120, which is comprised of a set of Q memory modules, $120_0, 120_1, \ldots, 120_{Q-1}$. The storage locations in each of the memory modules are not referenced by a contiguous set of addresses, and the particular mapping of the memory addresses referenced by the processor to the physical storage locations of the memory modules is known as the storage scheme of the system.

Figure 2:
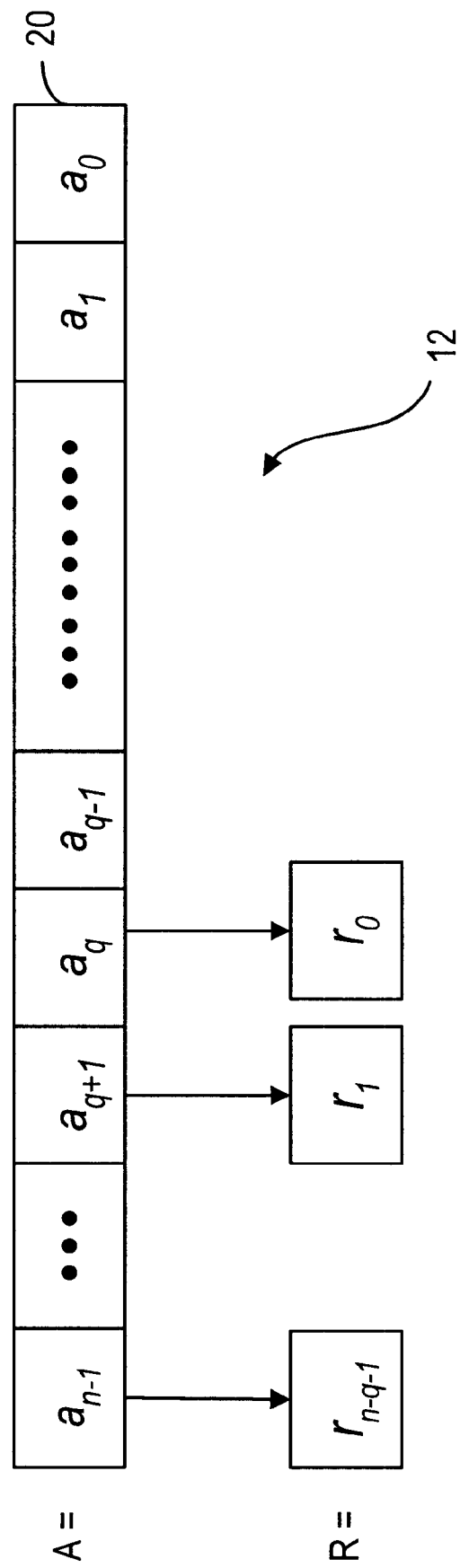
FIG. 2 is a block diagram showing the principle of row address generation, according to the present invention.

For the system shown in FIG. 1, the mapping is provided by an address generator 110 that dynamically changes the mapping based upon a predetermined access control 150 dependent on the number of elements in that data block and the number of memory modules. This predetermined access control is constant for so long as the number of elements in the data block stored into memory remains. The processor 140 performs Q references to the memory by placing Q address indexes onto Q address buses 160. The address generator 110 maps each address index $A_i$ to an address pair consisting of a memory module address $M_i$ and a row address $R_i$. The module address is used to transmit corresponding row address $R_i$ into the memory module $M_i$ through the switching network 132. At the same time, the path between data bus $D_i$ 170 and $M_i$ is established with the aid of the switching network 130, which allows data to be written into or read from memory. The row address $R_i$ is generated by a row address generator $12_i$, which is shown in FIG. 2. The memory module address $M_i$ is generated by a module address generator $10_i$, which is shown in FIGS. 3–6.

In a data processing environment where the number of data elements in a block is $N=2^n$ and these data elements are distributed over Q memory modules ($Q=2^q$ and $1<q<n$), n bits are needed to identify a single data element in a block (index address); q bits are needed to specify the individual memory module; and (n–q) bits are needed to address memory location in a specific memory module. Let us define the n bits for the index address as $A=(a_{n-1}, a_{n-2}, \ldots, a_2, a_1, a_0)$, with $a_{n-1}$ being the most significant bit; the q bits for the memory module address as $M=(m_{q-1}, m_{q-2}, \ldots, m_2, m_1, m_0)$, with $m_{q-1}$ being the most significant bit; and the (n–q) bits for the row address in a module as $R=(r_{n-q-1}, r_{n-q-2}, \ldots, r_2, r_1, r_0)$, with $r_{n-q-1}$ being the most significant bit. In order to access a single data element with index A (an n-bit address) in the data array, a q-bit module address M and an (n–q)-bit row address R need to be generated. In reality, Q such addresses are to be computed.

The row address R is formed simply by taking the (n–q) most significant bits of the index address A, which is denoted by reference numeral 20. For example, $R=(r_{n-q-1}, r_{n-q-2}, \ldots, r_2, r_1, r_0)=(a_{n-1}, a_{n-2}, \ldots, a_q)$, as shown in FIG. 2. However, the selection of these (n–q) bits is not critical; any (n–q) bits from A can be used as the row address R.

The module address M can be computed with the following equation:

$$m_i = \bigoplus_{j=0}^{\lfloor (n+q-gcd(q,mod(n,q)))-i-1)/q \rfloor} a_{mod(jq+i,n)}, i = 0, 1, \ldots, q-1. \quad (1)$$

where $\oplus$ denotes bitwise exclusive-OR operation, mod is a modulus operation, gcd(.) is the greatest common divisor, and $\lfloor . \rfloor$ denotes the floor operation. It should be noted that the order of bits $a_i$ is not critical; bits $a_i$ can be reordered to arbitrary order.

For example, the computation of the module address M can be interpreted as follows. The interpretation can be used in the realization of stride access.

First the index address A is divided into q-bit fields $F^i$ starting from the least significant bit of A, i.e., $$F^i=(a_{iq+q-1}, a_{iq+q-2}, \ldots, a_{iq+1}, a_{iq}), i=0,1,\ldots, \lfloor n/q \rfloor \quad (2)$$

If $e=mod(n,q)>0$, the e most significant bits of A exceeding the q-bit block border are extracted as a bit vector $L=(l_{e-1}, l_{e-2}, \ldots, l_0)$, which is, therefore, defined as $$L=(a_{n-1}, a_{n-2}, \ldots, a_{n-e}) \quad (3)$$

Next, a q-bit field $X=(x_{q-1}, x_{q-2}, \ldots, x_0)$ is formed by extracting the (q–h) least significant bits from index address A, where h=gcd(q,e), and concatenating zeros to the most significant end of the bit field, i.e, the h most significant bits of the bit field $F^0$ are zeroed as $$X=(0, \ldots, 0, a_{q-h-1}, \ldots, a_1, a_0) \quad (4)$$

The bit vector X is rotated g=mod(n–q,q) bits to the left to obtain a bit vector $O=(o_{q-1}, \ldots, o_0)$, i.e., $$O=\text{rot}_{mod(n-q,q)}(X) \quad (5)$$

where $\text{rot}_g(.)$ denotes rotation (circular shift) of the given bit vector operand g bits to the left, i.e., $$\text{rot}_g((a_{k-1}, a_{k-2}, \ldots, a_1, a_0))=(a_{k-g-1}, a_{k-g-2}, \ldots, a_0, a_{k-1}, \ldots, a_{k-g+1}, a_{k-g}) \quad (6)$$

The final module address M is obtained by performing bitwise exclusive-OR operation between the vectors $F^i$, O, and L as follows $$m_i = \begin{cases} o_i \oplus \left( \bigoplus_{j=0}^{\lfloor n/q \rfloor -1} a_{jq+i} \right), e \leq i < q \\ l_i \oplus o_i \oplus \left( \bigoplus_{j=0}^{\lfloor n/q \rfloor -1} a_{jq+i} \right), 0 \leq i < e \end{cases} \quad (7)$$

Figure 3:
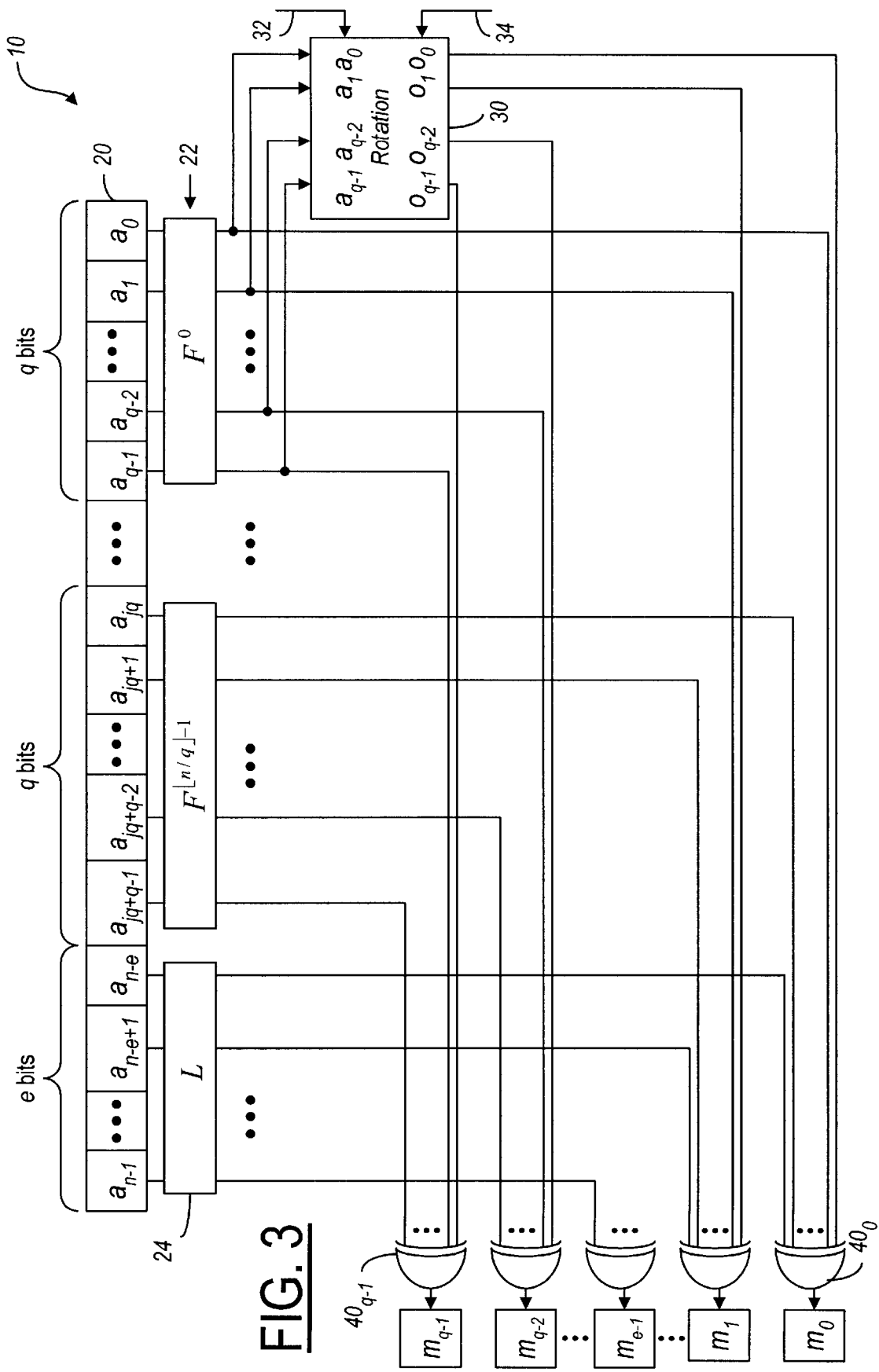
FIG. 3 is a block diagram showing the principle of module address generation, according to the preferred method of present invention.
Figure 4:
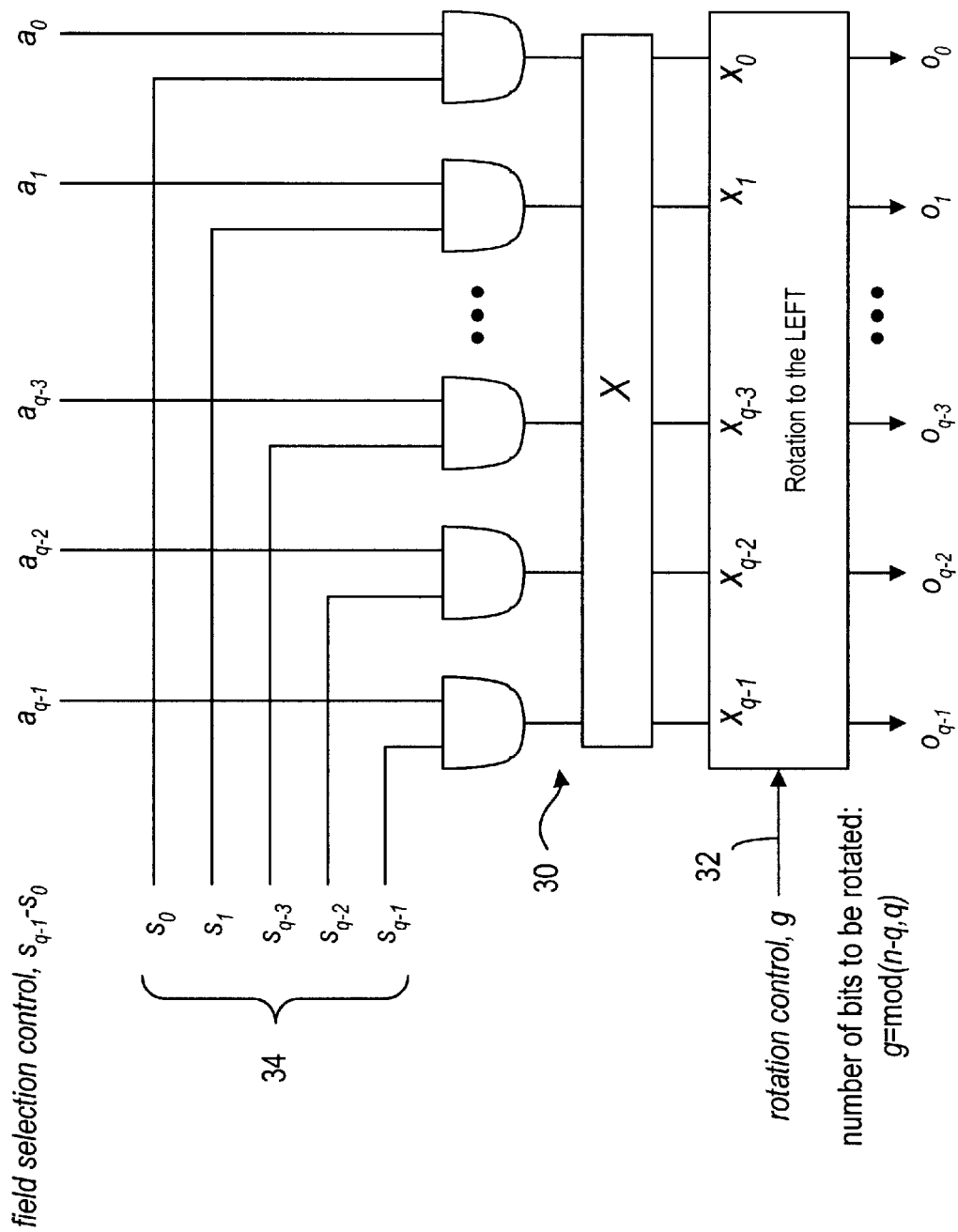
FIG. 4 is a block diagram showing the principle of a rotation unit, according to the present invention.

The principal block diagram of the module address generation 10 is illustrated in FIG. 3. As shown in FIG. 3, the index address A, which is denoted by reference numeral 20, is grouped into $\lfloor n/q \rfloor$ first field: $F^0, F^1, \ldots, F^{\lfloor n/q \rfloor -1}$ and one second field L. Each of the first fields, which is denoted by reference numeral 22, contains q bits. The second field L, denoted by reference numeral 24, contains e bits. Each of a group of q exclusive-OR devices $40_0, 40_1, \ldots, 40_{q-1}$ is used for bitwise exclusive-OR operation on a group of bits in corresponding positions in the first and second fields for providing the module address M. It should be noted that, one of first fields is subject to bit rotation to become a third field O before the bitwise exclusive-OR operation is performed. As shown in FIG. 3, the first field $F^0$ is converted into the third field by a rotation unit 30. Thus, the bitwise exclusive-OR operation on a group of bits in corresponding positions in the first, second, and third fields for providing the module address M for access elements in the Q memory modules. The rotation unit 30, under the rotation control 32 and the field selection control 34, is used to generate a q-bit field/vector O. It should also be noted that FIG. 3 illustrates how a single M is generated. In order to perform Q accesses, Q units similar to that illustrated in FIG. 3 are needed. The generation of vector O is illustrated in FIG. 4. As shown, the gcd(q,e) most significant bits are zeroed, i.e., the (q–h) least significant bits are passed through, with h=gcd(q,e), to form the q-bit vector $X=(0,0, \ldots, 0, a_{q-h-1}, a_{q-h-2}, \ldots, a_1, a_0)$. The selection of bits can be performed by providing a field selection control 34, which is a q-bit vector $S=(S_{q-1}, S_{q-2}, \ldots, s_1, s_0)$, where the q-h least significant bits are logical ones and the h most significant bits are logical zeros. When performing bitwise AND operation with the input vector, the vector X is formed. This bit vector is then rotated to the left g=mod(n–q, q) bits to produce the q-bit output vector $O=(O_{q-1}, O_{q-2}, \ldots, o_1, o_0)$.

It should be noted that the order of bits $a_i$ in the index address A is not important and A can be reordered into any arbitrary order. In similar fashion, the bits $m_i$ in module address M can be reordered into arbitrary order.

Alternative Method

Figure 5:
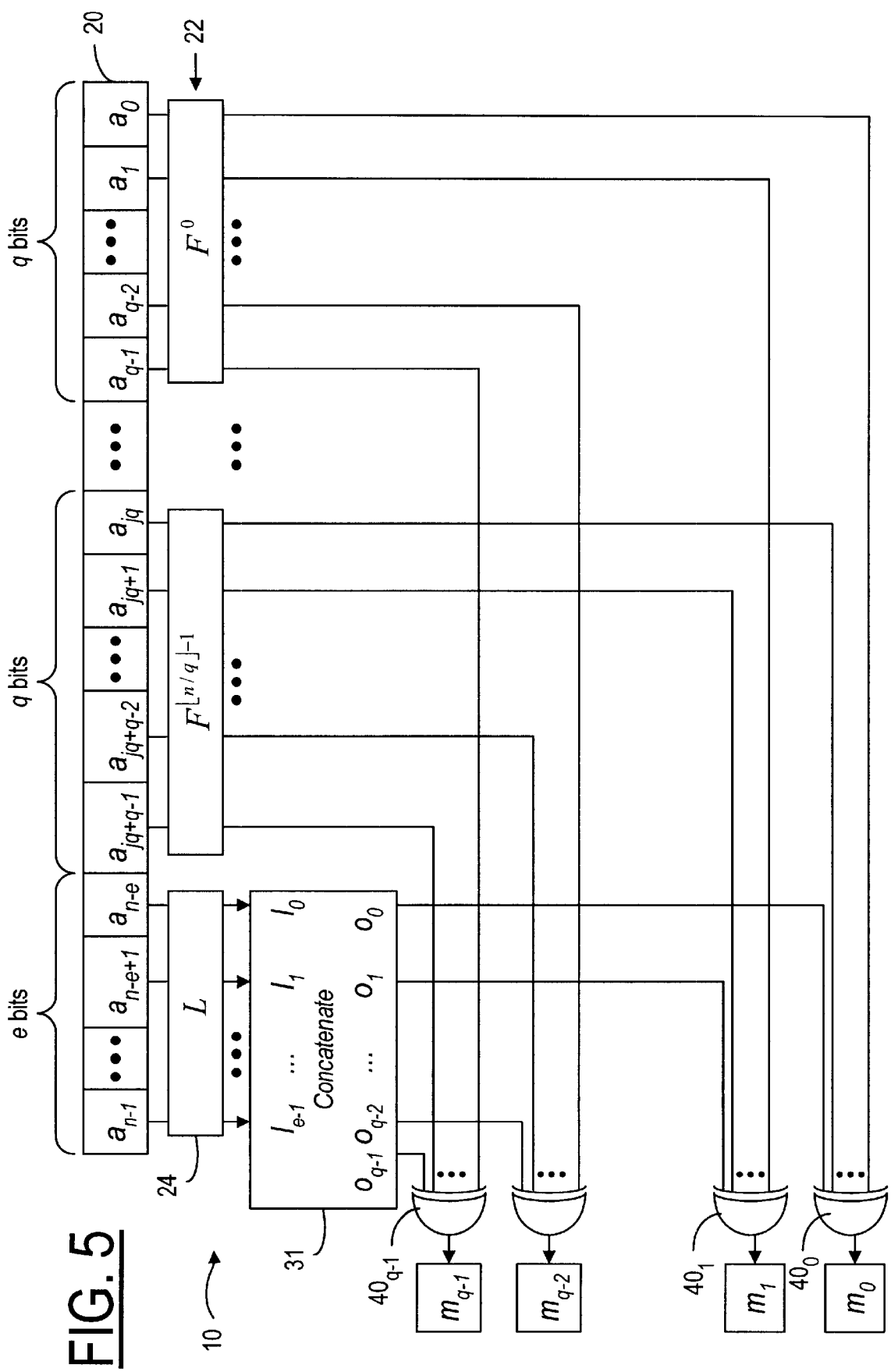
FIG. 5 is a block diagram showing an alternative method for module address generation.
Figure 6:
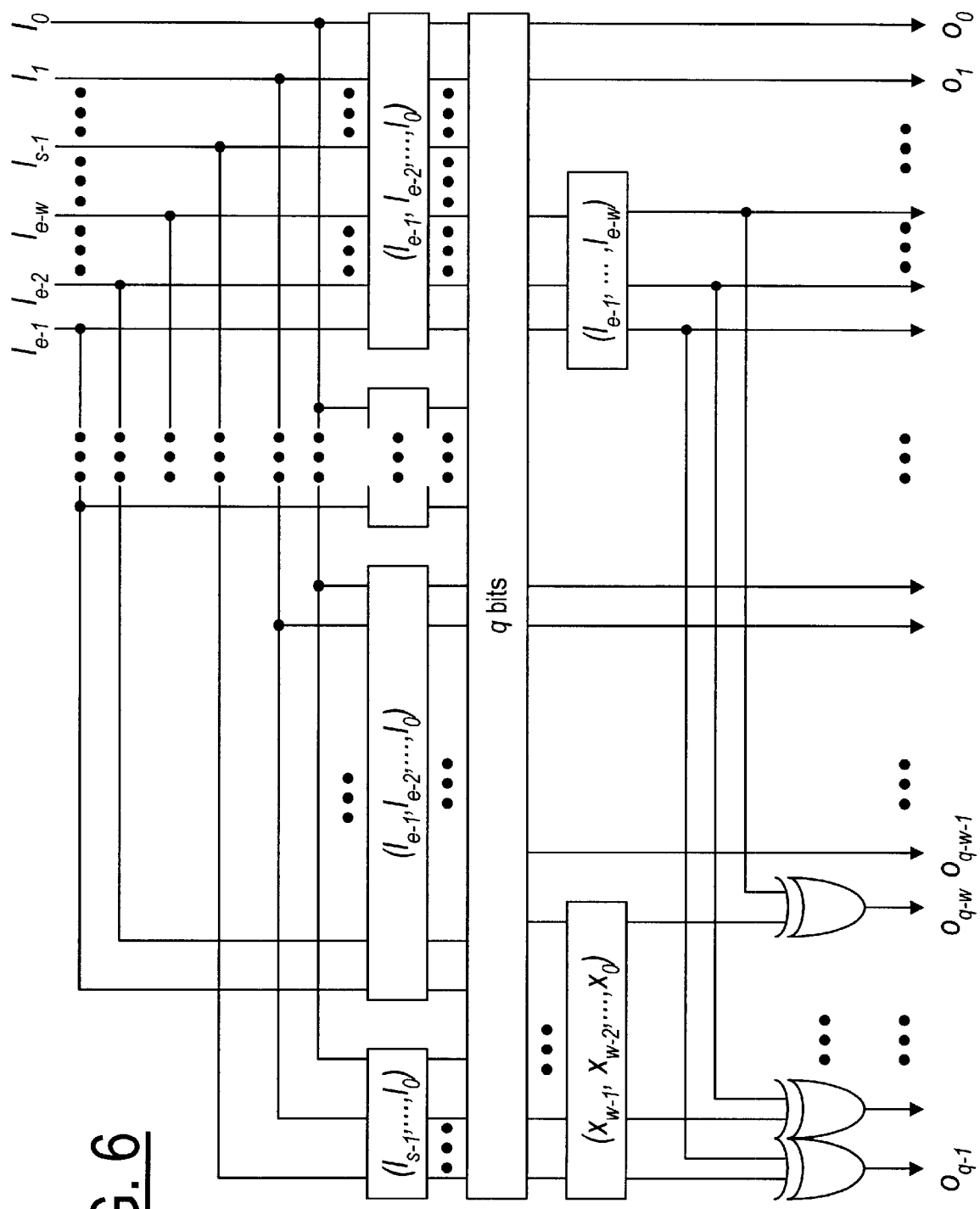
FIG. 6 is a block diagram showing a concatenation unit for the alternative method.

The alternative method is shown in FIGS. 5 and 6. The row address R is produced in the same way described earlier, as shown in FIG. 2. Again, the selection of (n−q) bits is not critical; any (n−q) bits from A can be used as row address R.

The module address M is obtained as follows:

First, the index address A is divided into q-bit fields starting from the least significant bit, i.e., bit vectors $F^i$ are formed as follows:

$$F^i = (a_{iq+q-1}, \ldots, a_{iq+1}, a_{iq}), i=0,1, \ldots, \lfloor n/q \rfloor \quad (8)$$

If e=mod(n,q) >0, i.e., e most significant bits of A exceed the q-bit border, a complete q-bit field cannot be formed at the most significant part. Then an additional q-bit field $O=(o_{q-1}, \ldots, o_0)$ is formed as follows. A bit vector $L=(l_{e-1}, l_{e-2}, \ldots, l_0)$ is formed containing the remaining e most significant bits of A, i.e., $L=(a_{q-1}, a_{q-2}, \ldots, a_{q-e})$. L is concatenated $\lfloor q/e \rfloor$ times, that is, L is copied $\lfloor q/e \rfloor$ times by a concatenate unit 31, as shown in FIG. 5.

If e=mod(n,q)=0, the module address M can be obtained by performing a bitwise exclusive-OR operation between the q-bit vectors $F^i$ as $$m_j = \bigoplus_{j=0}^{\lfloor n/q \rfloor - 1} a_{iq+j}, j = 0, 1, \ldots, q-1 \bigg| \mathrm{mod}(n, q) = 0 \quad (9)$$

In this case the concatenate unit 31 is not needed. Again the structure in FIG. 5 generates only one M. In reality Q such structures are needed to perform Q parallel accesses.

If s=mod(q, e)=0, concatenation produces a q-bit field, thus the vector O is formed as $$o_i = l_{\mathrm{mod}(i,e)}, i=0,1, \ldots, q-1 | \mathrm{mod}(q,e)=0 \quad (10)$$

If s=mod(q,e)>0, i.e., concatenation does not produce a q-bit vector, the remaining s bits are generated as follows. A vector X is formed by concatenating the s least significant bits of L and (w−s) most significant bits of L, where w is defined as $$w = e - \gcd(q,e) \quad (11)$$

Therefore, the w-bit vector X can be defined as $$X = (l_{s-1}, l_{s-2}, \ldots, l_0, l_{e-1}, l_{e-2}, \ldots, l_{e-w+s}) \quad (12)$$

The w most significant bits of vector O are obtained by performing the bitwise exclusive-OR operation between the w-bit vector X and the w most significant bits of L, $(l_{e-1}, l_{e-2}, l_{e-w})$, as $$o_{q-i} = x_{w-i} \oplus l_{e-i}, i=1,2, \ldots, w | \mathrm{mod}(q,e) > 0 \quad (13)$$

The remaining (q−w) least significant bits of O are obtained simply by concatenating the vector L as $$o_i = l_{\mathrm{mod}(i,e)}, i=0,1, \ldots, q-w-1 | \mathrm{mod}(q,e) > 0 \quad (14)$$

Computation of vector O is illustrated in FIG. 6.

Finally, the memory module address M can be obtained by performing bitwise exclusive-OR operation between the vectors $F^i$ and O as follows:

$$m_j = o_j \oplus \bigoplus_{i=0}^{\lfloor n/q \rfloor - 1} a_{iq+j}, j = 0, 1, \ldots, q-1 \bigg| \mathrm{mod}(n, q) > 0 \quad (15)$$

Again, the order of bits $a_i$ in the index address A is not important and A can be reordered into any arbitrary order. In similar fashion, the bits $m_i$ in module address M can be reordered into arbitrary order.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of accessing data elements of an N-element data block on N memory locations distributed over Q memory modules via Q parallel accesses, wherein said N memory locations are addressable in an n-bit index address, and said Q memory modules are addressable in a q-bit module address and an (n−q) bit row address, where $N=2^n$ and $Q=2^q$, characterized by:

selecting (n−q) bits from the index address for providing the row address;

grouping the index address into a plurality of fields comprising a number of first fields, wherein each of the first fields contains q bits; and performing a logical function operation on bits obtained from corresponding positions in said plurality of fields for providing the module address for accessing the data elements in said Q memory modules.

2. The method of claim 1, characterized in that said plurality of fields further comprise a second field, and the second field contains e bits, e being a positive integer smaller than q, and e depends on the relationship between n and q.

3. The method of claim 2, further characterized by performing a rotation operation on one of said plurality of fields such that h most significant bits of the field are set to logical zero for providing a third field, with h=gcd(q,e), wherein said logical function is also performed on the third field in addition to said plurality of fields.

4. The method of claim 2, further characterized by concatenating (q−e) zeros to the second field.

5. The method of claim 4, further characterized by performing a rotation operation on one of said plurality of fields for providing a third field, wherein said logical function is also performed on the third field in addition to said plurality of fields.

6. The method of claim 4, further characterized by performing a rotation operation on one of said plurality of fields such that h most significant bits of the field are set to logical zero for providing a third field, with h=gcd(q,e), wherein said logical function is also performed on the third field in addition to said plurality of fields.

7. The method of claim 2, characterized in that the e bits in the second field are arranged in an arbitrary order.

8. The method of claim 1, further characterized by performing a rotation operation on one of said plurality of fields for providing a third field, wherein said logical function is also performed on the third field in addition to said plurality of fields.

9. The method of claim 1, characterized in that said logical function is a bitwise exclusive-OR operation.

10. The method of claim 1, characterized in that said one of said plurality of fields having q bits, said q bits being less significant than bits in other of said plurality of fields.

11. The method of claim 1, characterized in that the n-bit index address is arranged in an arbitrary order.

12. The method of claim 1, characterized in that the q bits in memory module address are arranged in an arbitrary order.

13. The method of claim 1, characterized in that the (n−q) bits in row address are arranged in an arbitrary order.

14. An apparatus for accessing a data element of an N-element data block on N memory locations distributed over Q memory modules via Q parallel accesses, wherein said N memory locations are addressable in an n-bit index address, and said Q memory modules are addressable in a q-bit module address and an (n−q) bit row address, where $N=2^n$ and $Q=2^q$, characterized by:

means (12), operatively connected to the index address, for selecting (n−q) bits from the index address for providing the row address; and means (40), operatively connected to the index address, for grouping the index address into a plurality of fields comprising a number of first fields, and for performing a logical function operation on bits obtained from corresponding positions in said plurality of fields for providing the module address for accessing the data elements in said Q memory modules, wherein each of the first fields contains q bits.

15. The apparatus of claim 14, characterized in that said plurality of fields further comprise a second field, wherein the second field contains e bits, e being a positive integer smaller than q, and e depends on the relationship between n and q.

16. The apparatus of claim 15, further characterized by means (31), operatively connected to the second field, for concatenating (q−e) zeros to the second field prior to the performance of the logical function.

17. The apparatus of claim 14, further characterized by means (30), operatively connected to one of said plurality of fields, for performing a rotation operation on said one of said plurality of fields for providing a third field, wherein said logical function is also performed on the third field in addition to said plurality of fields.

18. The apparatus of claim 14, further characterized by means (30), operatively connected to one of said plurality of fields, for performing a rotation operation on said one of said plurality of fields such that h most significant bits of the field are set to logical zero for providing a third field, with h=gcd(q,e), wherein said logical function is also performed on the third field in addition to said plurality of fields.

19. The apparatus of claim 14, wherein the grouping and performing means (40) comprises a plurality of exclusive-OR devices.

20. A data processing system (100) comprising a memory unit (120) for storing data elements and a data processing module (140), operatively connected to the memory unit for accessing the data elements, wherein the memory unit comprises an N-element data block in N memory locations addressable in an n-bit index address (20), with $N=2^n$, characterized in that the N-element data block on N memory locations is distributed over Q memory modules ($120_0$, . . . , $120_{Q-1}$), wherein the Q memory modules are addressable in a q-bit module address (M) and an (n−q) bit row address (R), with $Q=2^q$;

the data processing module comprises Q data processors ($142_0$, . . . , $142_{Q-1}$), adapted to accessing the Q memory modules via Q parallel accesses; said system further characterized by an address generator (100), operatively connected to the memory unit, for providing access to the data elements in the memory unit, wherein the address generator comprises:

a first address generator (12), operatively connected to the index address (20), for providing the row address (R); and a second address generator (40), operatively connected to the index address (20), for providing the module address (M), and an interconnector means (130, 132), operatively connected to the address generator (100), the memory unit 120 and the data processor module 140, for allowing the Q data processors to access the data elements in the Q memory modules, wherein the row address provided by the first address generator (20) is selected from (n−q) bits of the index address, and the module address provided by the second address generator is obtained by:

grouping the index address (20) into a plurality of fields comprising a number of first fields, each first field containing q bits; and performing a logical function operation on bits obtained from corresponding position in said plurality of fields.

* * * * *

UNITED STATES PATENT AND TRADEMARK OFFICE
CERTIFICATE OF CORRECTION

PATENT NO. : 6,640,296 B2
DATED : October 28, 2003
INVENTOR(S) : Jarmo Takala

It is certified that error appears in the above-identified patent and that said Letters Patent is hereby corrected as shown below:

Column 1,
Lines 38 and 39, all instances of "X" should be -- x --.

Column 5,
Line 28, ",$m_{2,\,m1}$" should be -- ,$m_2$, $m_1$ --.

Column 6,
Lines 53 and 54, all instances of "S" inside parentheses should be -- s --.
Line 59, all instances of "O" inside parentheses should be -- o --.

Column 7,
Line 22, equation 9, the first occurrence of "j=0" should be -- i=0 --.

Signed and Sealed this

Thirteenth Day of January, 2004

JON W. DUDAS
*Acting Director of the United States Patent and Trademark Office*